United States Patent [19]

Choi

[11] Patent Number: 5,128,766
[45] Date of Patent: Jul. 7, 1992

[54] MULTIPLE TELEVISION RECEIVER WITH TELETEXT FUNCTION

[75] Inventor: Suk K. Choi, Kyungsangbuk, Rep. of Korea

[73] Assignee: Goldstar Co., Ltd., Seoul, Rep. of Korea

[21] Appl. No.: 618,713

[22] Filed: Nov. 27, 1990

[30] Foreign Application Priority Data

Nov. 30, 1989 [KR] Rep. of Korea .............. 17998/1989

[51] Int. Cl.⁵ .................... H04N 5/262; H04N 5/272
[52] U.S. Cl. ........................................ 358/183; 358/22
[58] Field of Search ................. 358/22 PIP, 22 C, 22, 358/183, 182, 181; 340/748, 721, 734

[56] References Cited

U.S. PATENT DOCUMENTS

| | | | |
|---|---|---|---|
| 4,216,492 | 8/1980 | Schmalz | 358/183 |
| 4,866,524 | 9/1989 | Six | 358/183 |
| 4,941,045 | 7/1990 | Birch | 358/135 |
| 4,991,012 | 2/1991 | Yoshino | 358/183 |

Primary Examiner—James J. Groody
Assistant Examiner—Sherrie Hsia
Attorney, Agent, or Firm—Rosen, Dainow & Jacobs

[57] ABSTRACT

A multiple television screen processing circuit having the teletext function. The circuit comprises a TV video signal generator for producing a TV video signal; a PIP signal generator for producing a PIP signal, an ON screen display signal generator for producing an ON screen display signal, and a teletext signal generator for producing a teletext signal, each of them being controlled by a microcomputer; a selection controller for combing logically said selection-controlling signals; a signal selector for selecting and outputting, under the control of the selection-controlling signals and the output signal of the selection controller, the TV video signal, the PIP signal, the ON screen display video signal or the teletext signal; an amplifier for amplifing the output signal of the signal selector; and a Braun tube for displaying the output signal of the amplifier. Thereby, on a screen can be simultaneously or separately displayed the TV video signal, the PIP signal and/or ON screen display signal; the teletext signal can be displayed on a screen with the ON screen display signal; or the teletext signal can be displayed on a screen with the PIP signal and the ON screen display signal.

4 Claims, 3 Drawing Sheets

FIG. 3

| | SP | So | ST | CS3 | OUTPUTS OF SWITCHES (61) | OUTPUTS OF SWITCHES (62) | OUTPUTS OF SWITCHES (64) | SELECTION FUNCTION |
|---|---|---|---|---|---|---|---|---|
| 1 | L | L | L | L | R-Y. G-Y. B-Y. Y | R$_T$. G$_T$. B$_T$ | R. G. B. | TV |
| 2 | L | L | H | H | R-Y. G-Y. B-Y. Y | R$_T$. G$_T$. B$_T$ | R$_T$. G$_T$. B$_T$ | TEXT |
| 3 | L | H | L | H | R-Y. G-Y. B-Y. Y | R$_O$. G$_O$. B$_O$ | R$_O$. G$_O$. B$_O$ | OSD |
| 4 | L | H | H | H | R-Y. G-Y. B-Y. Y | R$_O$. G$_O$. B$_O$ | R$_O$. G$_O$. B$_O$ | OSD |
| 5 | H | L | L | L | R$_P$-Y$_P$. G$_P$-Y$_P$ B$_P$-Y$_P$. Y$_P$ | R$_T$. G$_T$. B$_T$. | R$_P$. G$_P$. B$_P$ | PIP |
| 6 | H | L | H | L | R$_P$-Y$_P$. G$_P$-Y$_P$ B$_P$-Y$_P$. Y$_P$ | R$_T$. G$_T$. B$_T$ | R$_P$. G$_P$. B$_P$ | PIP |
| 7 | H | H | L | H | R$_P$-Y$_P$. G$_P$-Y$_P$ B$_P$-Y$_P$. Y$_P$ | R$_O$. G$_O$. B$_O$ | R$_O$. G$_O$. B$_O$ | OSD |
| 8 | H | H | H | H | R$_P$-Y$_P$. G$_P$-Y$_P$ B$_P$-Y$_P$. Y$_P$ | R$_O$. G$_O$. B$_O$ | R$_O$. G$_O$. B$_O$ | OSD |

FIG. 4A  TV

FIG. 4B  TX

FIG. 4C  PIP

FIG. 4D  OSD

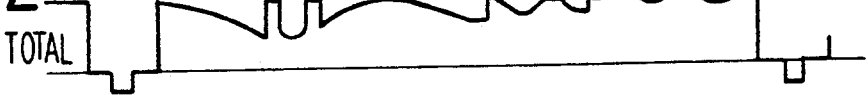

FIG. 4E  TOTAL

MULTIPLE TELEVISION RECEIVER WITH TELETEXT FUNCTION

BACKGROUND OF THE INVENTION

The present invention relates to a multiple television receiver with the teletext function, and more particularly to a multiple TV receiver with the teletext function in which a television video signal, a picture in picture (PIP) video signal, and ON screen display signal and/or teletext signal can be displayed on a screen simultaneously or separately.

In the conventional television receiver having multiple functions, the screen can simultaneously or separately display a television video signal, a multi-screen video signal and/or ON screen display signal. Namely, an ON screen display signal can be displayed on a screen the television video signal or the PIP signal, and also an ON screen display signal can be simultaneously displayed on the screen with the television video signal and the PIP video signal.

In a conventional television receiver having multiple functions, however, the teletext signal could not be simultaneously displayed on the screen with the television video signal, PIP signal and ON screen display signal.

SUMMARY OF THE INVENTION

The object of the present invention, accordingly, is to provide a multiple television receiver with a teletext function which can simultaneously or separately display television video signal, a PIP signal and/or ON screen display signal; the teletext signal can be displayed on a screen with the ON screen display signal; and the teletext signal can be simultaneously displayed on a screen with the PIP signal and the ON screen display signal.

The above object of the present invention can be achieved by outputting, under the control of a microcomputer, the selection-controlling signals from a PIP signal generator, an ON screen display signal generator, and a teletext signal generator; by selecting one of the output signal of the ON screen signal generator and the output signal of the teletext signal generator with the selection-controlling signal of the ON screen signal generator; by processing logically the selection-controlling signals of the PIP signal generator, ON screen display signal generator and teletext signal generator; and by selecting, with said logically-processed output of the logic circuit, one of said selected two signals.

BRIEF DESCRIPTION OF THE INVENTION

The above and other objects, features and advantages of the present invention will become more apparent from the following detailed description taken in connection with the accompanying drawings, in which:

FIG. 3 is a table showing the switching operation in accordance with the selection-controlling signal of FIG. 2; and FIGS. 4(A) to 4(E) are the waveforms, each of which correspond to the selection function of FIG. 3.

DETAILED DESCRIPTION OF THE INVENTION

Figure 1:
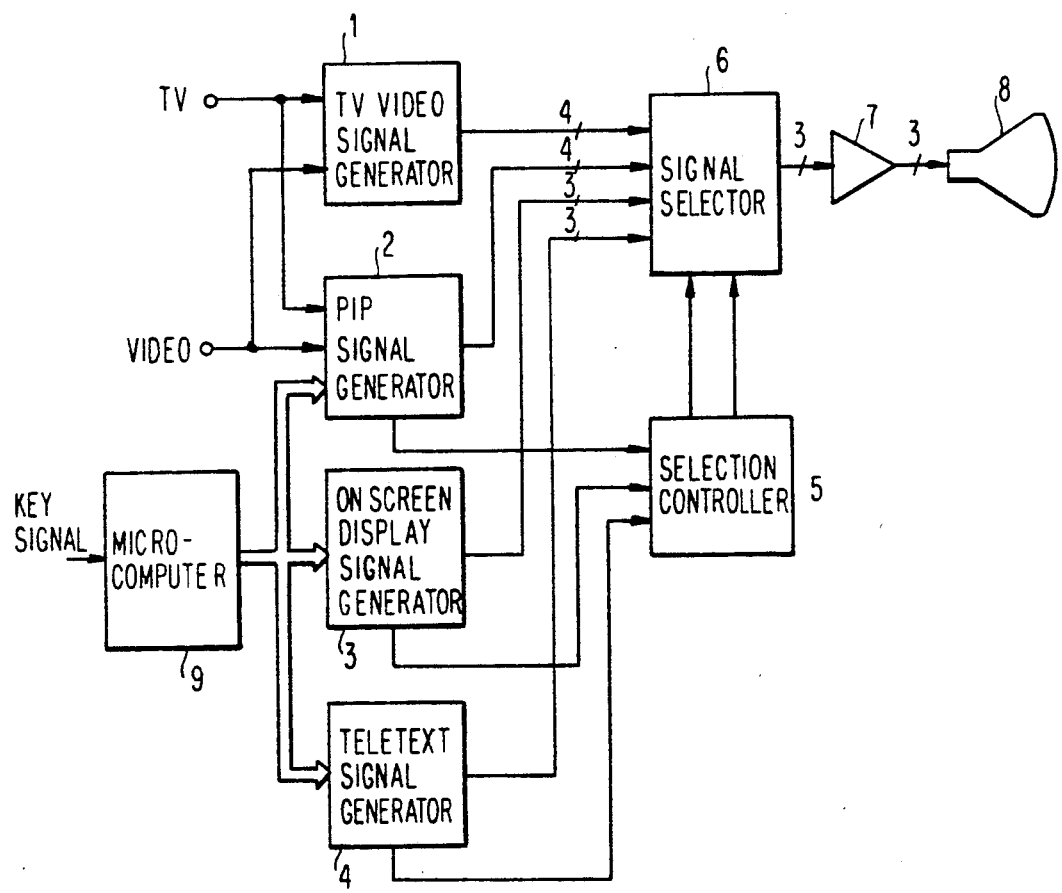
FIG. 1 is a block diagram of the present multiple television receiver with the teletext function.

FIG. 1 is a block diagram of the multiple television receiver with the teletext function of the present invention. In FIG. 1, the present invention includes a television video signal generator (1) producing a television video signal; a PIP signal generator (2) producing a PIP signal as well as outputting a selection-controlling signal ($S_P$) in accordance with the control signal of a microcomputer (9); an ON screen display signal generator (3) producing the ON screen display signal as well as outputting the selection-controlling signal ($S_O$) in accordance with the control signal of the microcomputer (9); a teletext signal generator (4) producing a teletext signal as well as outputting a selection-controlling signal ($S_T$) in accordance with the control signal of the microcomputer (9); a microcomputer (9) controlling said PIP signal generator (2), an ON screen display signal generator (3) and a teletext signal generator (4) in line with the key signal; a selection controller (5) combining logically the selection-controlling signals produced from the PIP signal generator (2), ON screen display signal generator (3) and teletext signal generator (4); a signal selector (6) selecting and outputting one of the television video signal, PIP signal, ON screen displays signal and teletext signal under the control of the selection controller (5); an amplifier (7) amplifying the output signal of the signal selector (6); and the Braun tube (8) displaying the output signal of the amplifier (7).

Figure 2:
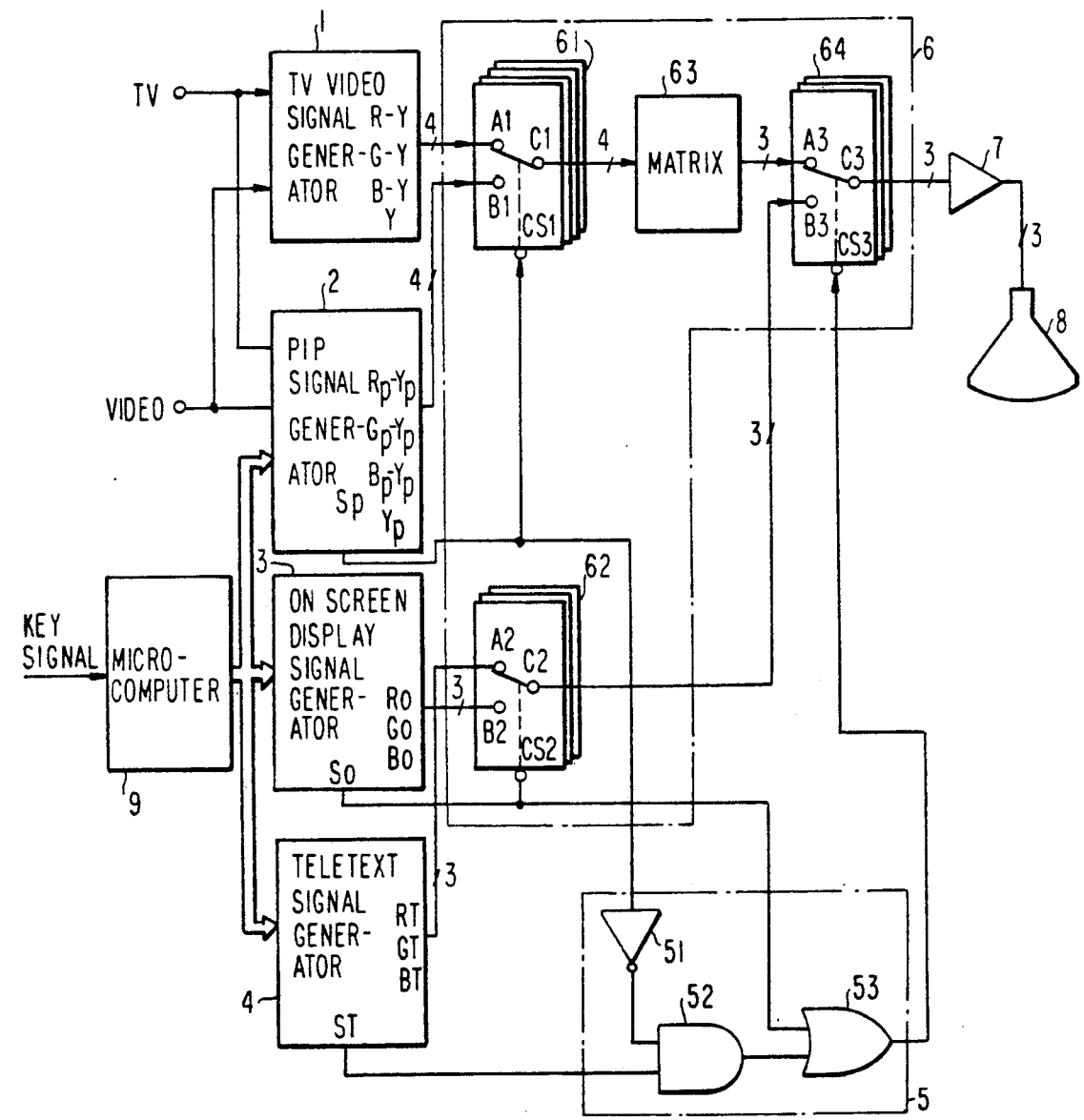
FIG. 2 is the detailed circuit diagram of a present invention shown in FIG. 1.

FIG. 2 is a detailed circuit diagram of the invention shown in FIG. 1. In FIG. 2, the selection controller (5) comprises an inverter (51) inverting the selection-controlling signal ($S_P$) outputted from the PIP signal generator (2), an AND gate (52) for AND-ing the output signal of said inverter (51) and the selection-controlling signal ($S_T$) of the teletext signal generator (4), and an OR gate 53 for OR-ing the selection-controlling signal ($S_O$) of the ON screen display signal generator (3) and the output of the AND gate (52). The signal selector (6) comprises switches (61) selecting in response to the selection-controlling signal ($S_P$) of the PIP signal generator (2), the output signal (R-Y, G-Y, B-Y, Y) of the television video signal generator (1) or the output signal ($R_P$-$Y_P$, $G_P$-$Y_P$, $B_P$-$Y_P$, $Y_P$) of the PIP signal generator (2); matrix (63) converting the output signal of the switches (61) into the color signal (R,G,B); switches (62) selecting, in response to selection-controlling signal ($S_O$) of the ON screen display signal generator (3), the output signal ($R_O$, $G_O$, $B_O$) of the ON screen signal generator (3) or the output signal ($R_T$, $G_T$, $B_T$) of the teletext signal generator (4); and switches (64) for selecting in response to the output signal of said selection controller (5), the output signal of the matrix (63) or the one of the switches (62). The switches (61), (62) and (64) are respectively constructed in a way that, upon the application of the low-level signal to their own controlling ports (CS1), (CS2), and (CS3), the movable terminals (C1), (C2), and (C3) are connected to the fixed terminals (A1), (A2), and (A3) respectively, while upon the application of the high-level signals to their own controlling ports (CS1), (CS2), and (CS3) the movable terminals (C1), (C2), and (C3) are connected to the other fixed terminals (B1), (B2), and (B3), respectively.

The operation of the present invention, as above described, will be explained also with reference to FIGS. 3 and 4.

In response to a control signal output from the microcomputer (9) corresponding to the key input signal for the television, the low-level selection-controlling signals ($S_P$), ($S_O$), and ($S_T$) are outputted from the PIP signal generator (2), the ON screen display signal generator (3), and the teletext signal generator (4), respectively, thereby connecting the movable terminals (C1) and (C2) of the switches (61) and (62) to the fixed terminals (A1) and (A2) thereof. At the same time, the low-level selection-controlling signal from the teletext signal generator (4) makes the AND gate (52) output the low-level signal even if the other input of the AND gate (52) is high with the inversion of the inverter (51) of the low-level selection-controlling signal ($S_P$) produced by the PIP signal generator. The output of the OR gate (53) will be low because the input thereof connected to the output of AND gate (52) is low and also the other input thereof is the low-level ON screen display signal ($S_O$). Accordingly, the movable terminal (C3) of the switches (64) is connected to the fixed terminal (A3) thereof. Then, the television video signals (R-Y, G-Y, B-Y, or Y) go through the switches (61) and are converted into the color signals (R,G,B) by the matrix (63). The color signals (R,G,B), pass via the switches (64), and are amplified by the amplifier (7) to be displayed on the Braun tube (8).

In response to the control signal output of the microcomputer (9) corresponding to the teletext function key, the high-level selection-controlling signal ($S_T$), as shown in FIG. 3, is outputted from the teletext signal generator (4) to be inputted into the second input of the AND gate (52). Meanwhile, the first input of the AND gate (52) is also in the high level state because the low-level selection-controlling signal ($S_P$) of the PIP signal generator (2) is inverted into a high level via the inverter (51). Thereby, the input of the OR gate (53) corresponding to output of the AND gate (52) is in the high level state so that the OR gate (53) outputs the high-level signal, causing the movable terminal (C3) of the switches (64) to be connected to the other fixed terminal (B3) thereof. Accordingly, the teletext video signals ($R_T$, $G_T$, $B_T$) of the teletext signal generator (4) shown in FIG. 4 (B) go through the switches (62) and (64) and are amplified by the amplifier (7) to be displayed on the Braun tube (8).

In response to the control signal output of the microcomputer (9) corresponding to the ON screen function key, the high-level selection-controlling signal ($S_O$), as shown in FIG. 3, is outputted from the ON screen display signal generator (3). The high-level selection-controlling signal ($S_O$) controls the movable terminal (C2) of the switches (62) to be connected to the fixed terminal (B2) thereof. With the high-level selection-controlling signal ($S_O$). also, the output of the OR gate (53) will be in the high level state which causes the movable terminal (C3) of the switches (64) to be connected to the fixed terminal (B3) thereof. Accordingly, the ON screen display signal ($R_O$, $G_O$, $B_O$) of the ON screen display signal generator (3), as shown in FIG. 4 (D), goes through the switches (62) and (64) and is amplified by the amplifier (7) to be displayed on the Braun tube (8). In response to the output of the high-level selection-controlling signal ($S_O$) of the ON screen display signal generator (3), as mentioned above, the movable terminal (C2) and (C3) of the switches (62) and (64) are connected to the other terminals (B2) and (B3) thereof regardless of the level of the selection-controlling signals ($S_P$) and ($S_T$) of the PIP signal generator (2) and the teletext signal generator (4). In response to the output of the high-level selection-controlling signal ($S_O$) from the ON screen display signal generator (3), as understood with reference to FIG. 3, the movable terminals (C2) and (C3) of the switches (62) and (64) will be connected to the fixed terminals (B2) and (B3) even if the high-level selection-controlling signals ($S_P$) and ($S_T$) are outputted from the PIP signal generator (2) and the teletext signal generator (4). Consequently, the ON screen display signals ($R_O$, $G_O$, $B_O$) of the ON screen display signal generator (3) will be displayed on the Braun tube (8).

The control signal of the microcomputer (9) corresponding to the PIP function key triggers only the PIP video signal generator (2) to output the high-level selection-controlling signal ($S_P$) of FIG. 3. The high-level selection-controlling signal ($S_P$) controls the movable terminal (C1) of the switches (61) to be connected to the fixed terminal (B1). The high-level selection-controlling signal ($S_P$) of the PIP signal generator (2) will be inverted into the low level by the inverter (51). The inverted low-level selection-controlling signal ($S_P$) will be applied to the first input of the AND gate (52). Accordingly, the output of the AND gate (52) will be low regardless of the level of the selection-controlling signal ($S_T$) from the teletext signal generator (4). In response to the low-level output of the AND gate (52) and the low-level selection-controlling signal ($S_O$) of the ON screen display signal generator (3), the output of the OR gate (53) will be in the low level state which causes the movable terminal (C3) of the switches (64) to be connected to the fixed terminal (A3) thereof. Accordingly, the PIP signals ($R_P$-$Y_P$, $G_P$-$Y_P$, $B_P$-$Y_P$, $Y_P$) of FIG. 4 (C) output from the PIP signal generator (2) will be converted into the color signals ($R_P$, $G_P$, $B_P$) by the matrix (63). The color signals ($R_P$, $G_P$, $B_P$ and) go through the amplifier (7) to be displayed on the Braun tube (8).

In conclusion, in response to each of the selection-controlling signals ($S_P$), ($S_O$), ($S_T$) of the PIP signal generator (2), the ON screen display signal generator (3) and the teletext signal generator (4) each being controlled by the microcomputer (9), the signal selector (6) will select, as shown in FIGS. 4 (A) to (D), one of the television video signal, teletext signal, PIP signal and ON screen display signal. The synthesized waveform of said signals, as shown in FIG. 4 (E), will be expressed during one horizontal period of the television screen.

As explained in the foregoing, the present invention can display separately on the television screen the television signal, PIP signal, ON screen display signal or teletext signal. Also, said signals can be simultaneously expressed during the horizontal period of the television screen. With the present invention, accordingly, the television receiver can be utilized in further multiple ways.

What is claimed is:

1. A television receiver having a teletext function comprising:
   a television video signal generator for producing a television video signal;
   means for producing a control signal;
   a picture in picture signal generator connected to produce a PIP signal as well as a selection-controlling signal ($S_P$) in response to said control signal;
   an ON screen display signal generator connected to produce an ON screen display signal and to output a selection controlling signal (S$_O$) in response to said control signal;

a teletext signal generator connected to produce a teletext signal and to output a selection-controlling signal (S$_T$) in response to said control signal;

said means for producing a control signal comprising a microcomputer connected to control said PIP signal generator, said ON screen display signal generator and teletext signal generator in line with a key signal;

a selection controller connected to logically combine said selection-controlling signals (S$_P$), (S$_O$) and (S$_T$);

a signal selector connected to select and output one of said television video signal, PIP signal, ON screen display signal and teletext signal, in response to the selection controlling signal output from said selection controller; and a displayer connected to display the selection controller signal output from said signal selector.

2. A circuit according to claim 1, wherein said selection controller comprises an inverter producing an output signal and connected to invert said selection-controlling signal (S$_P$); an AND gate producing an output signal and connected to AND the output signal of said inverter and said selection-controlling signal (S$_T$) from said teletext signal generator; and an OR gate having an output signal and connected to OR said output signal of said AND gate and said selection-controlling signal (S$_O$).

3. A circuit according to claim 1, wherein said signal selector comprises first switching means connected to select said television video signal or said PIP signal, as an output signal, in response to said selection-controlling signal (S$_P$); a matrix connected to convert said output signal of said switching means to color signals as an output signal; second switching means connected to select said ON screen display signal or said teletext signal in response to said selection-controlling signal (S$_O$); and third switching means connected to select the output signal of said matrix or the output signal of said second switching means in response to an output signal of said selection controller.

4. A circuit according to claim 2, wherein said signal selector comprises first switching means connected to select said television video signal or said PIP signal, as an output signal, in response to said selection-controlling signal (S$_P$); a matrix connected to convert said output signal of said first switching means to color signals as an output signal; second switching means connected to select said ON screen display signal or said teletext signal in response to said selection-controlling signal (S$_O$); and third switching means connected to select the output signal of said matrix or the output signal of said second switching means in response to an output signal of said selection controller.

* * * * *